Sept. 9, 1952    O. E. WATSON    2,609,833
PRESSURE RANGE CONTROL
Filed Dec. 15, 1944    2 SHEETS—SHEET 1

INVENTOR
ORLA E. WATSON
BY
Marvin B. Davis
ATTORNEY

Sept. 9, 1952  O. E. WATSON  2,609,833
PRESSURE RANGE CONTROL
Filed Dec. 15, 1944  2 SHEETS—SHEET 2

INVENTOR
ORLA E. WATSON
BY
Mervin B Davis
ATTORNEY

Patented Sept. 9, 1952

2,609,833

UNITED STATES PATENT OFFICE 2,609,833

PRESSURE RANGE CONTROL

Orla E. Watson, Kansas City, Mo.

Application December 15, 1944, Serial No. 568,340

1 Claim. (Cl. 137—492)

This invention relates to improvements in a control for variable fluid pressure range of main distributors, gas wells, and other variable pressure apparatus.

In the operation of oil wells it is deemed necessary to keep a back pressure on the well for the best yield of oil and never let the back pressure drop too low.

An object of the present invention is to provide an improved range control that will cause a diaphragm motor valve of an oil or gas well to open when the pressure of the well rises to a predetermined high pressure, operate to the maximum pressure of the well and close the diaphragm motor valve when the well pressure drops to a predetermined low pressure. For example, the well may be controlled to start flow when the pressure reaches 1,000 pounds and shut off the flow when the pressure drops to 500 pounds or any pressure desired within the range of the control.

Another object of the present invention is to provide selective control of a diaphragm motor valve to control the fluid pressure of the well.

Another object of the present invention is to provide a control that will operate on a reduced pressure, for example 15 pounds gauge pressure, by means of a pressure reducing valve in a control line leading from the well casing to one side of the control mechanism and the direct pressure of the well actuating the opposite side of the control mechanism.

Another object of the present invention is to provide a differential selective pressure control to open the diaphragm motor valve on one selective well pressure and close the diaphragm motor valve on another selective well pressure.

Another object of the present improved invention is to provide all control mechanism in a single small compact unit that can easily be manufactured inexpensively and be conveniently installed at the well, exposed to the open weather conditions and control the present type diaphragm motor valve in a pressure fluid range.

With these and other objects in view the present invention further consists in the combination of parts illustrated in the accompanying drawings or described in the specification and more particularly pointed out in the claim appended herewith.

Figure 1:
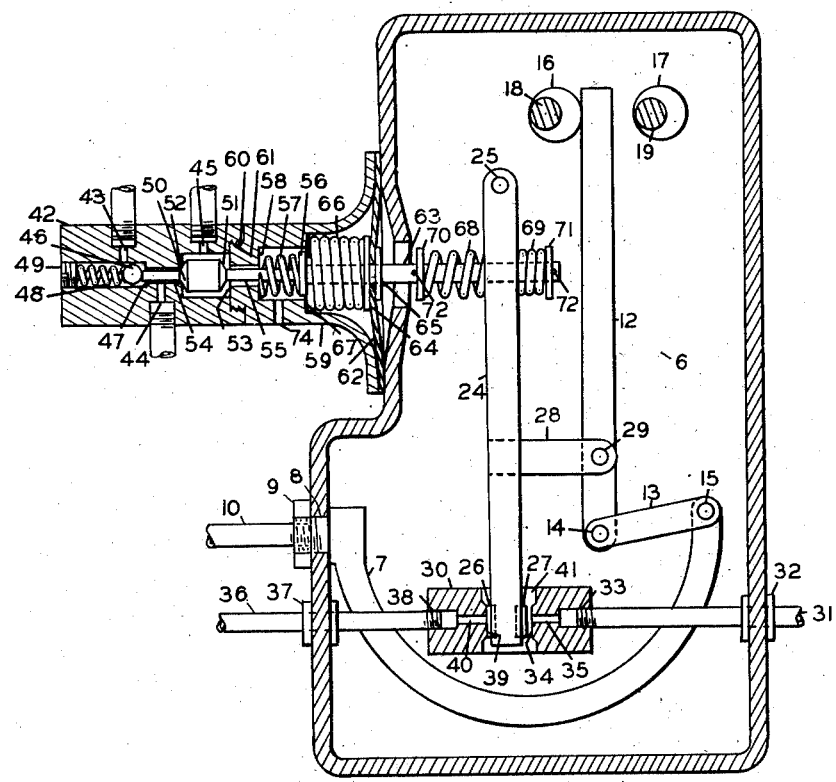
Figure 1 is an interior longitudinal view of the control mechanism.

A fluid pressure case 6 has a Bourdon tube 7 connected to the side thereof by a threaded portion 8 and lock nut 9, the Bourdon tube being normally connected to an oil well casing 11 by line 10 or other similar pressure systems. One end of the Bourdon tube 7 is connected to a fluid pressure range selector lever 12 by a connecting link 13 and pins 14 and 15 respectively.

The fluid pressure range selector lever 12 is restricted in movement between cams 16 and 17 which are integral on shafts 18 and 19 respectively. The shafts 18 and 19 are pivoted in the pressure case 6 at 20 and 21 and are manually turned by fluid pressure range selector dials 22 and 23, the dial 22 being the high pressure selector and the dial 23 being the low pressure selector.

A valve lever 24 has one end pivoted on pin 25 and a pair of valves 26 and 27 located near the opposite end of the pivoted lever, the valves being recessed in the lever for position and support. An arm 28 extends from the valve lever 24 and is fulcrumed on the range selector lever 12 by pin 29. Pin 25 is screwed into boss 77 of case 6.

A twin valve housing 30 is supported in the pressure case 6 by a fluid pressure inlet 31 attached to the casing 6 by seal 32, and to the housing by threaded end 33, the housing having a valve seat 34 for the reception of inlet valve 27, an opening 35 connecting the valve seat 34 to inlet line threaded end 33.

An exhaust line 36 extends through the seal 37 in the case 6 and has one threaded end 38 connected to the end supporting housing 30. A valve seat 39 in the housing 30 receives the exhaust valve 26 and the seat 39 is connected to the exhaust line 36 through exhaust opening 40. The valve lever 24 being pivoted and supporting the valves 26 and 27 on the opposite sides thereof reciprocates to open one valve when the other valve is closed, the lever reciprocating in the valve housing recess 41 of housing 30.

A valve manifold casing 42 is provided with port 43, port 44 and port 45. A ball valve 46 is normally seated against the ball valve seat 47 by a compression spring 48 held in the manifold casing by screw 49 threaded into the head 42.

Opposed integral valves 50 and 51 seat on valve seats 52 and 53 respectively, one valve being open when the opposite valve is closed. The valves 50 and 51 have valve stems 54 and 55 respectively, the valve stem 54 opening ball valve 46 when valve 50 is in a closed or seated position on seat 52.

The valve stem 55 integral with valve 51 extends therefrom to join a spring seat 56. A compression spring 57 is located between the spring seat 56 and spring seat 58 to normally hold valve 51 against valve seat 53. The valve manifold casing 42 is connected to a diaphragm housing 59 by threaded portions 60 and 61, the diaphragm housing being machine screwed to case 6 by screws 79. The diaphragm 62 is held between diaphragm housing 59 and case 6 and is concentrically located on the diaphragm stem 63 and held in fixed position to the stem by flanges 64 and 65. The diaphragm 62 is normally held in a position toward the case 6 by a diaphragm spring 66 which is seated against flange 64 and diaphragm housing spring seat 67.

The diaphragm stem 63 extends through valve lever 24 and has booster compression springs 68 and 69 located thereon. The compression springs 68 and 69 are seated against spring seat washers 70 and 71 respectively, the spring seat washers being held on the valve stem by cotter pins 72.

Figure 4:
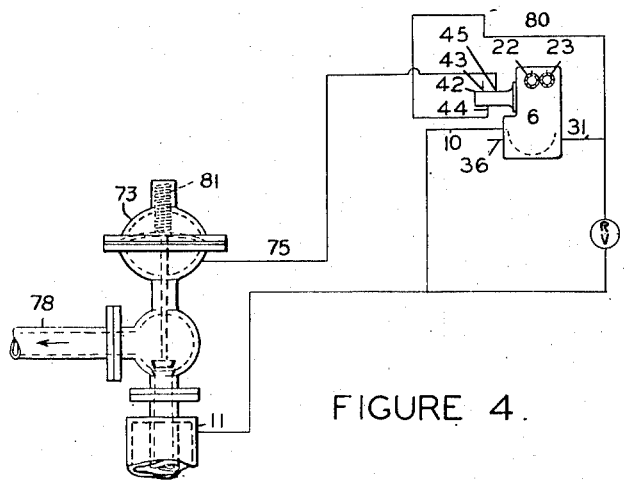
Figure 4 is a diagrammatic view of the control connected to a diaphragm motor valve having a spring closing and pressure opening control.

In the operation of the control as illustrated in Figure 4 fluid flows from well casing 11 through line 10 to Bourdon tube 7 and to reducing valve RV, the fluid pressure being reduced to flow through line 80 to ports 31 and 44. When the fluid pressure from the casing in line 10 reaches a predetermined well opening flow pressure, for an example 1,000 pounds, the Bourdon tube 7 expands closing valve 27 through levers 12, 24, arm 28, link 13 and one end of the lever 12 bearing against selective cam 16.

Case 6 vents to the atmosphere through valve 26 and line 36 to allow diaphragm 62 to move toward the casing 6 on diaphragm stem 63 by means of spring 66. The spring 57 on stem 55 closes valve 51, to port 74, opens opposed valve 50 to port 45 and stem 54 allowing ball valve 46 to close by spring 48. Fluid control line 80 connects to port 44, the fluid passes through valve 50 to port 45 and line 75 to the diaphragm motor valve 73 to open it. When the well fluid pressure drops to a predetermined low shut-off pressure the Bourdon tube contracts moving the lever 12 to bear against selective pressure cam 17, closing valve 26 to the atmosphere, opening the valve 27 to fill the case 6 with fluid from the reducing valve RV. The case 6 fills with fluid pressure, moves diaphragm 62 outwardly from the case 6, compresses valve spring 66, opens valve 51, closes valve 50 and opens ball valve 46. The diaphragm motor valve 73 with a closing spring 81 exhausts the fluid through line 75 to port 45, passes through valve 51 to port 74 to escape to the atmosphere. Port 43 is plugged.

Figure 5:
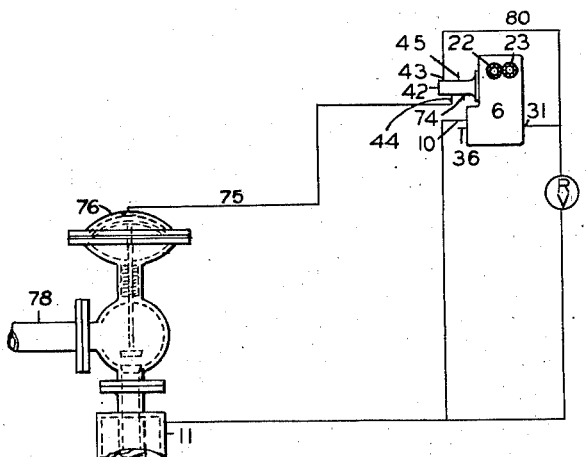
Figure 5 is a diagrammatic view of the control connected to a diaphragm motor valve having a spring opening and pressure closing control.
Figure 2:
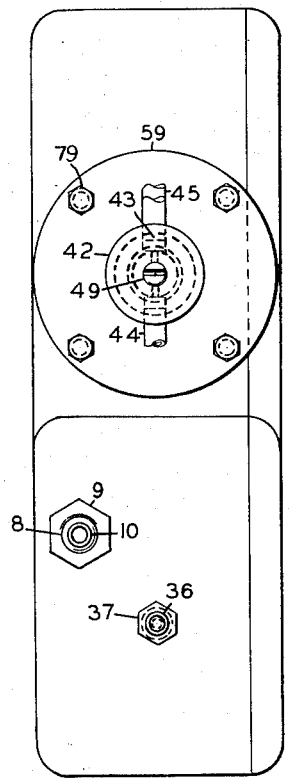
Figure 2 is an end view of the control mechanism.
Figure 3:
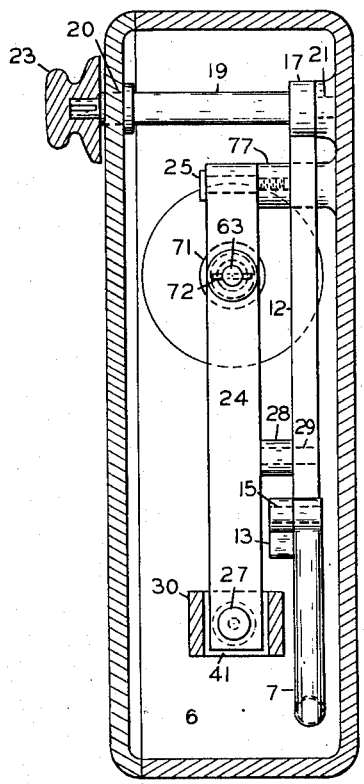
Figure 3 is a lateral view of the control mechanism.

The operation of the control as illustrated in Figure 5 is the same as previously described except line 80 connects to port 43, the fluid passing through ball valve 46 to port 44, and line 75 to diaphragm motor spring opening valve 76 which requires fluid control pressure to close the well valve. It is obvious that when the Bourdon tube 7 is expanded by high pressure, ball valve 46 closes, fluid from line 75 vents to port 45 and opens diaphragm motor valve 76.

What I claim as new and desire to secure by Letters Patent, is:

A fluid pressure range control comprising a hermetically sealed case, a Bourdon tube within said sealed case, one end of said Bourdon tube being closed, the open end of said Bourdon tube being connected to said sealed case and opening therethrough to the outside thereof for a fluid conduit line, a selector lever, said selector lever having one end thereof connected to the closed end of said Bourdon tube through a pivoted connecting link, a valve lever within said sealed case, said valve lever being pivoted within said sealed case, a valve casing comprising a plurality of valves and valve ports, said valve casing being connected to said sealed case, a valve stem, said valve stem being an actuator of the plurality of said valves in said valve casing and extended into said sealed case, resilient members, said valve stem being connected to said valve lever, a diaphragm, said diaphragm arranged on said valve casing and being attached to said valve stem, means within said valve casing to normally press said diaphragm toward said sealed case, said sealed case having a fluid opening therethrough to one side of said diaphragm, an inlet valve, an outlet valve, said inlet and outlet valves mounted inside of said sealed case, conduits connecting said inlet and outlet valves to the outside of said sealed case, said inlet and outlet valves being operated by said valve lever, said valve lever being actuated by said valve stem, said resilient members being on said valve stem and bearing against said valve lever, a pair of shafts spaced apart and mounted within said sealed case, a pair of fluid pressure selector cams secured on said shafts within said sealed case, a pair of graduated dials secured on the outside of said sealed case for the selection of fluid pressure, the free end of said selector lever being located between and having its movement restricted by said selector cams whereby the expansion of said Bourdon tube through a high fluid pressure therein will cause the closed end thereof to pull on the link end of said selector lever, the selector lever being fulcrumed on the valve lever arm will have its free end forced against one of said selector cams and when the pressure in said Bourdon tube is reduced to a low selector pressure the selector lever will move through space to bear against the opposite selector cam, said selector lever operating said valve lever controlling said inlet and outlet valves to control the fluid pressure within said sealed case and said fluid within said sealed case operating said diaphragm on the valve stem and plurality of valves in said valve casing to oppose said means within said valve casing for the remote control of a diaphragm valve.

ORLA E. WATSON.

REFERENCES CITED

The following references are of record in the file of this patent:

UNITED STATES PATENTS

| Number | Name | Date |
|---|---|---|
| 1,840,228 | Elfers | Jan. 5, 1932 |
| 2,185,671 | Kimball | Jan. 2, 1940 |
| 2,196,279 | Thomas | Apr. 9, 1940 |
| 2,292,426 | Bailey | Aug. 11, 1942 |
| 2,327,055 | McMahon | Aug. 17, 1943 |